United States Patent
Xie

(10) Patent No.: US 8,032,638 B2
(45) Date of Patent: Oct. 4, 2011

(54) CALLING METHOD FOR NODE ACROSS ZONES IN IP NETWORK SYSTEM

(75) Inventor: Jinsong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 847 days.

(21) Appl. No.: 10/488,111

(22) PCT Filed: Mar. 29, 2002

(86) PCT No.: PCT/CN02/00221
§ 371 (c)(1),
(2), (4) Date: Feb. 27, 2004

(87) PCT Pub. No.: WO03/19862
PCT Pub. Date: Mar. 6, 2002

(65) Prior Publication Data
US 2004/0186913 A1    Sep. 23, 2004

(30) Foreign Application Priority Data
Aug. 29, 2001    (CN) .................................. 01 1 30991

(51) Int. Cl.
*G06F 15/16* (2006.01)
(52) U.S. Cl. ........................................ 709/227; 370/392
(58) Field of Classification Search .................. 709/230, 709/238, 246, 205, 227, 245, 249, 220, 225; 379/289; 370/392
See application file for complete search history.

(56) References Cited

U.S. PATENT DOCUMENTS

| | | | |
|---|---|---|---|
| 4,287,592 A * | 9/1981 | Paulish et al. ................. | 370/403 |
| 4,677,588 A * | 6/1987 | Benjamin et al. ............. | 709/228 |
| 5,493,607 A * | 2/1996 | Arumainayagam et al. ......................... | 379/88.18 |
| 6,067,529 A * | 5/2000 | Ray et al. ........................ | 705/26 |
| 6,351,464 B1 * | 2/2002 | Galvin et al. ................. | 370/356 |
| 6,373,857 B1 * | 4/2002 | Ma ................................ | 370/475 |
| 6,507,647 B1 * | 1/2003 | Mandalia ..................... | 379/219 |
| 6,542,935 B1 * | 4/2003 | Ishii ............................... | 709/245 |
| 6,614,781 B1 * | 9/2003 | Elliott et al. .................. | 370/352 |
| 6,862,626 B1 * | 3/2005 | Ryu .............................. | 709/227 |
| 6,868,140 B2 * | 3/2005 | Myers et al. ................. | 379/67.1 |
| 7,356,040 B2 * | 4/2008 | Parra-Moyano et al. ..... | 370/422 |
| 2002/0029288 A1 * | 3/2002 | Dobbins et al. .............. | 709/238 |
| 2002/0042832 A1 * | 4/2002 | Fallentine et al. ........... | 709/230 |

(Continued)

FOREIGN PATENT DOCUMENTS

EP    0964560 A1    12/1999

(Continued)

OTHER PUBLICATIONS

U.S. Appl. No. 60/156,363, filed Sep. 1999, Roy.*

(Continued)

*Primary Examiner* — David Lazaro
*Assistant Examiner* — Marie Georges Henry

(57) ABSTRACT

The invention discloses a calling method for endpoint across zones in IP network system. The method implements, simply and conveniently, endpoint addressing and calling across GK zones. The method includes: pre-registering an E.164 alias for each endpoint to a gatekeeper managing the endpoint in IP network system, wherein the E.164 alias comprises a gatekeeper zone prefix uniquely indicating the gatekeeper in the IP network system and a unique number indicating the endpoint in its own gatekeeper; a calling endpoint calling a called endpoint with the E.164 alias of the called endpoint.

11 Claims, 3 Drawing Sheets

U.S. PATENT DOCUMENTS

| | | | |
|---|---|---|---|
| 2004/0223488 A1* | 11/2004 | Roy | 370/352 |
| 2006/0285541 A1* | 12/2006 | Roy | 370/389 |
| 2009/0052457 A1* | 2/2009 | Salama et al. | 370/392 |

FOREIGN PATENT DOCUMENTS

| | | |
|---|---|---|
| EP | 1081920 | 3/2001 |
| EP | 1089520 | 4/2001 |
| JP | 11-284667 A | 10/1999 |
| JP | 2001-156852 A | 6/2001 |
| JP | 2002-247634 A | 8/2002 |
| WO | WO 9859467 | 12/1998 |
| WO | 01/58091 | 8/2001 |

OTHER PUBLICATIONS

Radhika R. Roy, ITU Telecommunication Standardization Sector, Oct. 1999.*

ITU-T, H.323, "Packet-Based Multimedia Communications Systems"; ITU-T; H.323; XX, XX; Sep. 1999; pp. 1-129; XP002166480.

Decision to Refuse a European Patent Application for European Patent Application No. 02 721 957.5, dated Sep. 16, 2009.

* cited by examiner

CALLING METHOD FOR NODE ACROSS ZONES IN IP NETWORK SYSTEM

FIELD OF THE TECHNOLOGY

The invention relates generally to an IP network technology, more specifically to a method that makes a call crossing zones in an IP network system. It is a technology about setting a unique IP alias for all H.323 endpoints on the IP network.

BACKGROUND OF THE INVENTION

The H.323 protocol was mainly used in multimedia conference system, and now is popularly used in telephony over IP. An H.323 system offers multimedia communication service for a packet network. The packet network includes local area networks (LAN), enterprise networks and metropolitan-area networks etc., which does not provide guaranteed Quality of Service. The H.323 system is consisted of terminals, gateways, Multipoint Control Units (MCU) and Gatekeepers (GK) etc. An H.323 endpoint is consisted of a terminal, Gateway, or MCU. The H.323 endpoint makes a register at its own GK and serviced by the GK.

In the H.323 systems, one of the main services provided by the GK is address resolution, which includes translating an endpoint alias into IP address of the endpoint. The endpoint alias includes E.164 telephone number, H.323ID, URL and EMAIL etc., and these aliases are registered to the GK through the Registration Request (RRQ) signaling of the H.225 Registration, Admission and Status (RAS) protocol from the endpoint. In an H.323 system there may be many GK zones. Every GK zone includes one or several GK and a collection of endpoints, and each endpoint makes the register at its own GK respectively.

In present standard protocol, each endpoint alias in a GK zone must be unique, but endpoint aliases at different GK zones do not have this limitation. Thus, it is possible that different endpoints at different GK zones may have same alias. This will have calling and addressing difficulties for an endpoint across GK zones.

FIG. 1 shows an H.323 system networking with two GK zones: Zone 1 managed by GK1 and Zone 2 managed by GK2, and there are repetitive endpoint aliases between these two zones. At Zone 1, there are three endpoints with aliases 123456, 123123 and 123789, respectively. At Zone 2, there are also three endpoints with the same aliases: 123456, 123123 and 123789, respectively. In this case, the IP addresses of endpoints in the same zone can be obtained each other by address resolution service of the GK where the endpoint is located, but among endpoints in different zone, there is no way to translate the IP addresses of endpoints with same aliases.

For example, suppose endpoint 123456 of Zone 1 originates a call to endpoint 123123 of Zone 2, GK1 only can translate the called endpoint 123123 into an IP address in Zone 1 and return the IP address to the calling endpoint 123456, but can not translate IP address of the called endpoint alias 123123 in Zone 2 and return to the calling endpoint alias 123456.

Advantage of the above configuring method for an endpoint alias is that there is no limitation for naming every endpoint alias in each GK zone. Nevertheless, since there is no identical configuring method for aliases among H.323 systems, a GK only can translate IP addresses of endpoints in domestic zone but other zones. This cause is that no a technique to guarantee a unique alias of every endpoint in a whole network.

At present, along with development of video communication on IP network and increase of endpoint in IP network system, it gets more and more outstanding for the unique IP alias of endpoint.

SUMMARY OF THE INVENTION

An embodiment of the present invention provides a calling method for endpoint across zones in IP network system. With an identical endpoint alias naming, all endpoint aliases is unique in the network system so that a call and addressing across zones among any endpoints in different GK zone can be implemented conveniently on IP network.

A calling method for endpoint across zones in IP network system may include:

pre-registering an E.164 alias for each endpoint to a gatekeeper managing the endpoint in IP network system, wherein the E.164 alias comprises a gatekeeper zone prefix uniquely indicating the gatekeeper in the IP network system and a unique number indicating the endpoint in its own gatekeeper;

a calling endpoint calling a called endpoint with the E.164 alias of the called endpoint.

The invention needs to define every GK zone in IP network system with a unique number to form the prefix of a endpoint alias, and forms an endpoint number of the endpoint alias by means of a unique number of each endpoint within every GK zone; and then makes "said prefix for GK zone+endpoint number" to form a pre-defined (pre-registered) E.164 alias of an endpoint.

Compare with the present technology, the invention solves the problem about uniqueness of a endpoint alias on a whole network. Therefore, any GK on the whole network can translate IP address of any endpoint on IP network according to the aliases. In this way, a calling across zones can be implemented conveniently.

EMBODIMENTS OF THE INVENTION

The invention will be described in more detail with reference to the drawings.

The main thinking to name a endpoint with a unique alias is that: first, each endpoint in every zone is named with an E.164 number as the unique alias in domestic zone, i.e. the pre-defined E.164 number of every endpoint is registered to the GK that manages the endpoint; then the E.164 number is combined with a unique zone number of each GK zone in the network system to form the unique endpoint alias. With this unique alias, addressing and calling across zones are implemented.

Figure 1:
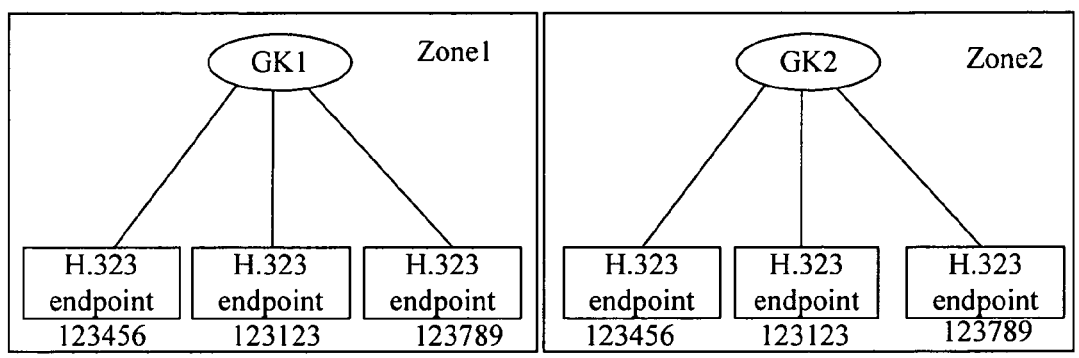
FIG. 1 shows a diagram of a general H.323 system with endpoints and zones in prior art.
Figure 2:
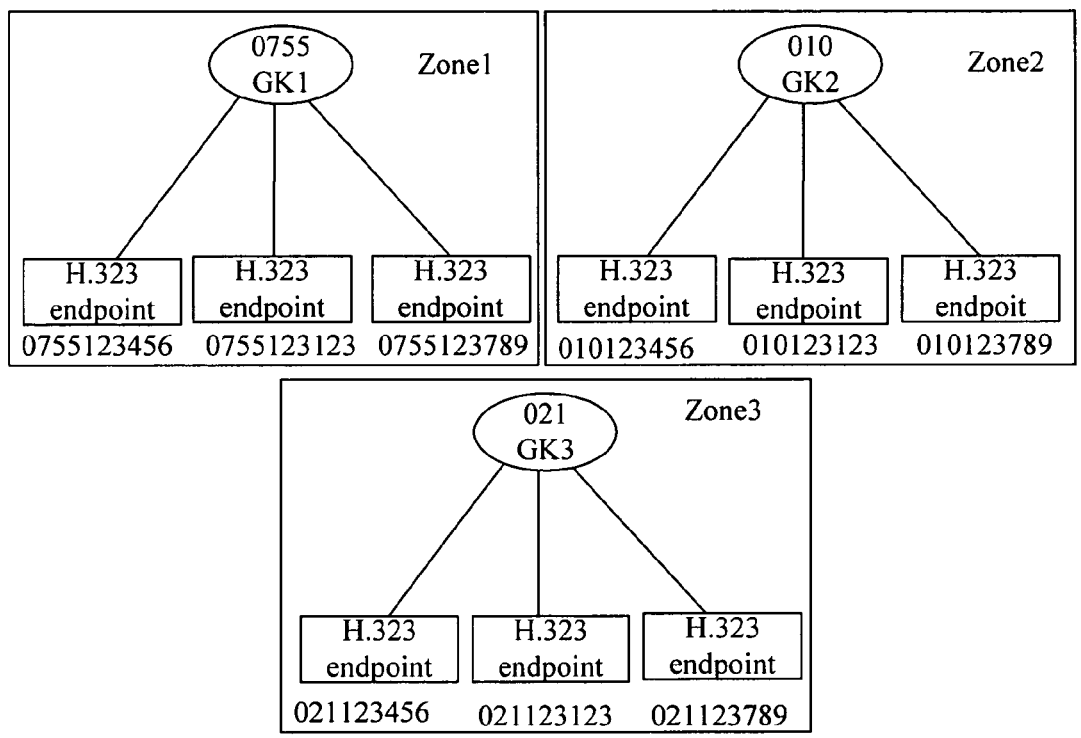
FIG. 2 shows a diagram of an embodiment H.323 system with endpoints and zones for the invention.

In FIG. 2, there are three GK zones, and each zone has a unique number as a prefix for endpoints naming. Every GK zone prefix does not repeat in whole IP network system. For example, the GK zone prefix of Zone 1 is 0755, the GK zone prefix of Zone 2 is 010, and the GK zone prefix of Zone 3 is 021.

In a GK zone, E.164 numbers of all endpoints in that zone do not repeat, but in different zones E.164 numbers of endpoints may be identical, for example, there are identical E.164 numbers 123456, 123123 and 123789 in Zone 1, Zone 2 and Zone 3.

In the invention, each endpoint alias in every GK zone is consisted of "GK zone prefix"+"E.164 number of the endpoint". For example, three endpoints aliases in Zone 1 are: 0755123456, 0755123123 and 0755123789; three endpoints aliases in Zone 2 are: 010123456, 010123123 and 010123789; and three endpoints aliases in Zone 3 are: 021123456, 021123123 and 021123789. With this naming method, every endpoint alias on the whole network is unique.

Because every endpoint alias is pre-defined by GK, the register must be made according to appointed alias. It guarantees uniqueness of endpoint alias.

The invention has solved the problem about uniqueness of an endpoint alias, so a technical base for implementing calling across zones is set up.

Figure 3:
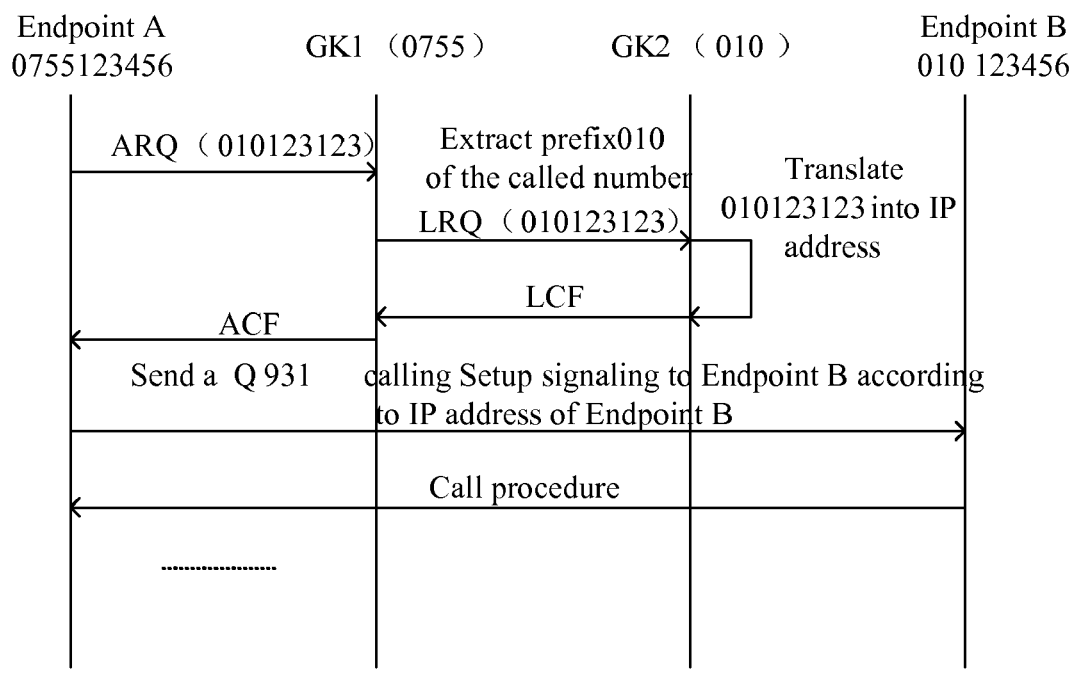
FIG. 3 shows the procedure of a call that crosses to other zone.

Refer to FIG. 3 and FIG. 2; suppose Endpoint A with alias 0755123456 originates a calling to Endpoint B with alias 010123123, the calling procedure is as follow.

Step 1, Endpoint A (0755123456) sends ARQ (Admission Request) signaling to GK1;

Step 2, GK1 extracts the prefix 010 of the called endpoint alias from the received ARQ signaling and knows that the called Endpoint B is located at the GK2 zone according to the extracted prefix (i.e. GK1 obtains IP address of the called GK2); and then GK1 sends a LRQ (Location Request) signaling with the called endpoint alias 010123123 to GK2 to ask for translating IP address of Endpoint B;

Step 3, after having received the LRQ signaling, GK2 translates the IP address of Endpoint B according to the called endpoint alias 010123123, and responses a LCF (Location Confirmation) signaling with the IP address of Endpoint B to GK1;

Step 4, after having received the LCF signaling, GK1 responses a ACF (Admission Confirm) signaling with the IP address of Endpoint B to Endpoint A;

Step 5, according to the IP address of Endpoint B, Endpoint A sends a Q.931 calling setup signaling to Endpoint B to initiate a call;

Step 6, the procedure enters the call proceeding.

The invention uses an identical naming method for all endpoints aliases in an IP network system by E.164 aliases. In this way, implementation of an endpoint addressing and calling that crosses zones is simplified and convenient. Tests have shown that the method is feasible and reliable.

The invention claimed is:

1. A calling method for use by a first endpoint within a first zone to initiate calls across zones in an Internet Protocol (IP) network system, comprising:
Sending, at the first endpoint, a prefixed alias of a second endpoint within a second zone to a second gatekeeper of the second zone via a first gatekeeper of the first zone; the prefixed alias of the second endpoint comprising a combination of a unique alias within the second zone and a prefix identifying the second gatekeeper in the IP network system, and the first gatekeeper being configured to receive the prefixed alias of the second endpoint from the first endpoint of the first zone, locate the second gatekeeper according to the prefix and send the prefixed alias of the second endpoint to the second gatekeeper;
receiving, at the first endpoint, an address of the second endpoint from the second gatekeeper through the first gatekeeper; the second gatekeeper being configured to receive the prefixed alias from the first gatekeeper, obtain the address of the second endpoint according to the prefixed alias, and send the address of the second endpoint to the first gatekeeper; the first gatekeeper being further configured to send the address of the second endpoint to the first endpoint; wherein the address of the second endpoint obtained by the second gatekeeper according to the prefixed alias is an IP address of the second endpoint; and
initiating a call directly to the second endpoint using the address of the second endpoint.

2. The calling method of claim 1, wherein the process of sending the prefixed alias of the second endpoint to the second gatekeeper via the first gatekeeper comprises:
sending an Admission Request (ARQ) signaling to the first gatekeeper, the ARQ signaling carrying the prefixed-alias; and the first gatekeeper being configured to extract the prefix from the prefixed alias, obtain an IP address of the second gatekeeper based on the prefix, and according to the IP address of the second gatekeeper, send a Location Request (LRQ) signaling to the second gatekeeper the LRQ signaling carrying the prefixed alias;
wherein the process of receiving the address of the second endpoint from the second gatekeeper via the first gatekeeper comprises:
receiving an Admission Confirm (ACF) signaling from the first gatekeeper;
the ACF signaling comprising an IP address of the second endpoint; and the second gatekeeper being configured to obtain the IP address of the second endpoint according to the prefixed alias and send to the first gatekeeper a Location Confirmation (LCF) signaling, the LCF signaling carrying the IP address of the second endpoint; and
wherein the process of initiating a call to the second endpoint based on the address of the second endpoint comprises:
sending a Q.931 calling setup signaling to the second endpoint according to the IP address of the second endpoint.

3. An endpoint address obtaining method for use by a first gatekeeper of a first zone in an Internet Protocol (IP) network system, comprising:
receiving, at the first gatekeeper, a prefixed alias of a second endpoint within a second zone from a first endpoint within the first zone; the prefixed alias comprising a combination of a unique alias within the second zone and a prefix identifying a second gatekeeper of the second zone in the IP network system;
locating, at the first gatekeeper, the second gatekeeper according to the prefix and sending the prefixed alias to the second gatekeeper;
receiving, at the first gatekeeper, an address of the second endpoint from the second gatekeeper, the address of the second endpoint being obtained by the second gatekeeper according to the prefixed alias; wherein the address of the second endpoint obtained by the second gatekeeper according to the prefixed alias is an IP address of the second endpoint; and
sending the address of the second endpoint to the first endpoint.

4. The method of claim 3, wherein the process of receiving a prefixed alias of a second endpoint within a second zone from a first endpoint within a first zone comprises:
receiving an Admission Request (ARQ) signaling from the first endpoint, the ARQ signaling carrying the prefixed alias;
wherein the process of locating the second gatekeeper according to the prefix and sending the prefixed alias to the second gatekeeper comprises:
extracting the prefix from the prefixed alias;
obtaining an IP address of the second gatekeeper based on the prefix; and sending a Location Request (LRQ) signaling to the second gatekeeper according to the IP address of the second gatekeeper; the LRQ signaling carrying the prefixed alias and the second gatekeeper being further configured to obtain an IP address of the second endpoint according to the prefixed alias and send a Location Confirmation (LCF) signaling, the LCF signaling carrying the IP address of the second endpoint;

wherein the process of receiving the address of the second endpoint from the second gatekeeper comprises:

receiving the LCF signaling from the second gatekeeper; and wherein the process of sending the address of the second endpoint to the first endpoint comprises:

sending an Admission Confirm (ACF) signaling to the first endpoint, the ACF signaling carrying the IP address of the second endpoint.

5. An endpoint address obtaining method for use by a second gatekeeper of a second zone in an Internet Protocol (IP) network system, comprising:

receiving, by the second gatekeeper a prefixed alias of a second endpoint within the second zone from a first endpoint within a first zone via a first gatekeeper of the first zone; the prefixed alias of the second endpoint comprising a combination of a unique alias within the second zone and a prefix identifying the second gatekeeper in the IP network system, and the first gatekeeper being configured to receive the prefixed alias from the first endpoint, locate the second gatekeeper according to the prefix and send the prefixed alias to the second gatekeeper;

obtaining, by the second gatekeeper, an address of the second endpoint according to the prefixed alias; wherein the address of the second endpoint obtained by the second gatekeeper according to the prefixed alias is an IP address of the second endpoint; and sending, by the second gatekeeper, the address of the second endpoint to the first endpoint via the first gatekeeper; the first gatekeeper being further configured to receive the address of the second endpoint from the second gatekeeper and send the address of the second endpoint to the first endpoint.

6. The method of claim 5, wherein the process of receiving a prefixed alias of a second endpoint within the second zone from a first endpoint within a first zone via a first gatekeeper of the first zone comprises:

receiving a Location Request (LRQ) signaling from the first gatekeeper, the LRQ signaling carrying the prefixed alias, and the first gatekeeper being configured to receive an ARQ (Admission Request) signaling carrying the prefixed alias from the first endpoint, extract the prefix from the prefixed alias, obtain an IP address of the second gatekeeper based on the prefix, and send a LRQ signaling carrying the prefixed alias to the second gatekeeper;

wherein the process of sending the address of the second endpoint to the first endpoint via the first gatekeeper comprises:

sending a Location Confirmation (LCF) signaling carrying the IP address of the second endpoint to the first gatekeeper; the first gatekeeper being further configured to send an Admission Confirm (ACF) signaling carrying the IP address of the second endpoint to the first endpoint.

7. An endpoint in a first zone for communicating across zones in an Internet Protocol (IP) network system, comprising a processor configured to:

send a prefixed alias of a second endpoint within a second zone to a second gatekeeper of the second zone via a first gatekeeper of the first zone; the prefixed alias of the second endpoint comprising a combination of a unique alias within the second zone and a prefix identifying the second gatekeeper in the IP network system, and the first gatekeeper being configured to receive the prefixed alias from the endpoint, locate the second gatekeeper according to the prefix and send the prefixed alias to the second gatekeeper;

receive an address of the second endpoint from the second gatekeeper through the first gatekeeper; the second gatekeeper being configured to receive the prefixed alias from the first gatekeeper, obtain the address of the second endpoint according to the prefixed alias, and send the address of the second endpoint to the first gatekeeper;

wherein the address of the second endpoint obtained by the second gatekeeper according to the prefixed alias is an IP address of the second endpoint; and the first gatekeeper being further configured to send the address of the second endpoint to the endpoint; and initiate a call to the second endpoint based on the address of the second endpoint.

8. A gatekeeper in a first zone for communicating across zones in an Internet Protocol (IP) network system, comprising a processor configured to:

receive a prefixed alias of a second endpoint within a second zone from a first endpoint within the first zone; the prefixed alias comprising a combination of a unique alias within the second zone and a prefix identifying a second gatekeeper of the second zone in the IP network system;

locate the second gatekeeper according to the prefix and sending the prefixed alias to the second gatekeeper;

receive an address of the second endpoint from the second gatekeeper, the address of the second endpoint being obtained by the second gatekeeper according to the prefixed alias; wherein the address of the second endpoint obtained by the second gatekeeper according to the prefixed alias is an IP address of the second endpoint; and send the address of the second endpoint to the first endpoint.

9. A gatekeeper in a second zone for communicating across zones in an Internet Protocol (IP) network system, comprising a processor configured to:

receive a prefixed alias of a second endpoint within the second zone from a first endpoint within a first zone via a first gatekeeper of the first zone; the prefixed alias of the second endpoint comprising a combination of a unique alias within the second zone and a prefix identifying the second gatekeeper in the IP network system, and the first gatekeeper being configured to receive the prefixed alias from the first endpoint, locate the second gatekeeper according to the prefix and send the prefixed alias to the second gatekeeper;

obtain an address of the second endpoint according to the prefixed alias; wherein the address of the second endpoint obtained according to the prefixed alias is an IP address of the second endpoint; and send the address of the second endpoint to the first endpoint via the first gatekeeper.

10. An Internet Protocol (IP) network system, comprising:

a first gatekeeper of a first zone, configured to receive an prefixed alias of a second endpoint within a second zone from a first endpoint within the first zone, the prefixed alias comprising a combination of a unique alias within the second zone and a prefix identifying a second gatekeeper in the IP network system, and further configured to locate the second gatekeeper based on the prefix and send the prefixed alias of the second endpoint to the second gatekeeper; and the second gatekeeper, configured to receive the prefixed alias of the second endpoint from the first gatekeeper, obtain an address of the second endpoint according to the prefixed alias, and send the address of the second endpoint to the first gatekeeper; wherein the address of the second endpoint obtained by the second gatekeeper according to the prefixed alias is an IP address of the second endpoint;

wherein the first gatekeeper is further configured to send the address of the second endpoint to the first endpoint.

11. A method for calling across zones in an Internet Protocol (IP) network system, comprising:

by a first endpoint within a first zone, sending a prefixed alias of a second endpoint within a second zone to a first gatekeeper of the first zone; the prefixed alias of the second endpoint comprising a combination of a unique alias within the second zone and a prefix identifying a second gatekeeper of the second zone in the IP network system, by the first gatekeeper, receiving the prefixed alias of the second endpoint from the first endpoint, extracting the prefix from the received prefixed alias, obtaining an IP address of the second gatekeeper according to the prefix and sending the prefixed alias of the second endpoint to the second gatekeeper;

by the second gatekeeper, receiving the prefixed alias of the second endpoint from the second gatekeeper, the second gatekeeper being configured to receive the prefixed alias from the first gatekeeper, obtain an address of the second endpoint according to the prefixed alias, and send the address of the second endpoint to the first gatekeeper;

the first gatekeeper is further configured to send the address of the second endpoint to the first endpoint; wherein the address of the second endpoint obtained by the second gatekeeper according to the prefixed alias is an IP address of the second endpoint; and by the first endpoint, initiating a call to the second endpoint according to the address of the second endpoint.

* * * * *